US012354476B2

(12) United States Patent
Ziebart et al.

(10) Patent No.: US 12,354,476 B2
(45) Date of Patent: Jul. 8, 2025

(54) METHOD FOR OUTPUTTING A STARTING REGION FOR A PARKING PROCESS OF A MOTOR VEHICLE, ELECTRONIC COMPUTING APPARATUS, AND MOTOR VEHICLE

(71) Applicant: Volkswagen Aktiengesellschaft, Wolfsburg (DE)

(72) Inventors: Sascha Ziebart, Calberlah (DE); Philipp Hüger, Rühen (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 18/571,550

(22) PCT Filed: Jun. 15, 2022

(86) PCT No.: PCT/EP2022/066358
§ 371 (c)(1),
(2) Date: Dec. 18, 2023

(87) PCT Pub. No.: WO2023/274729
PCT Pub. Date: Jan. 5, 2023

(65) Prior Publication Data
US 2024/0290205 A1    Aug. 29, 2024

(30) Foreign Application Priority Data
Jun. 29, 2021   (DE) ...................... 10 2021 206 771.9

(51) Int. Cl.
*G08G 1/14*      (2006.01)
*B60K 35/28*     (2024.01)
(Continued)

(52) U.S. Cl.
CPC ............. *G08G 1/143* (2013.01); *B60K 35/28* (2024.01); *B60Q 1/48* (2013.01); *B60W 30/06* (2013.01);
(Continued)

(58) Field of Classification Search
CPC .. G08G 1/143; B60K 35/28; B60K 2360/177; B60K 2360/29; B60K 2360/785;
(Continued)

(56) References Cited

U.S. PATENT DOCUMENTS

| 8,389,520 B2 | 3/2013 | Thede et al. ............... 514/235.8 |
| 8,781,170 B2 | 7/2014 | Mathieu et al. .............. 382/104 |

(Continued)

FOREIGN PATENT DOCUMENTS

| DE | 102004020424 A1 | 11/2005 | ............. B62D 15/02 |
| DE | 102006050516 A1 | 4/2008  | ......... A61K 31/4439 |

(Continued)

OTHER PUBLICATIONS

German Office Action, Application No. 102021206771.9, 6 pages, Apr. 22, 2022.

(Continued)

*Primary Examiner* — Omeed Alizada
(74) *Attorney, Agent, or Firm* — Slayden Grubert Beard PLLC

(57) ABSTRACT

The disclosure relates to a method for outputting a starting region for a parking process of a motor vehicle, in which the starting region for the motor vehicle on a road is determined for at least one determined parking space, starting from which region it is possible for the motor vehicle to be parked in the parking space in one go, and the starting region is output overlying the road in a field of view of the driver.

17 Claims, 1 Drawing Sheet

(51) Int. Cl.
  *B60Q 1/48* (2006.01)
  *B60W 30/06* (2006.01)
  *B60W 50/14* (2020.01)

(52) U.S. Cl.
  CPC ....... *B60W 50/14* (2013.01); *B60K 2360/177* (2024.01); *B60K 2360/29* (2024.01); *B60K 2360/785* (2024.01); *B60Q 2400/50* (2013.01); *B60W 2050/146* (2013.01)

(58) Field of Classification Search
  CPC ..... B60Q 1/48; B60Q 2400/50; B60W 30/06; B60W 50/14; B60W 2050/146; B62D 15/029; B62D 15/028; B62D 1/00
  See application file for complete search history.

(56) References Cited

U.S. PATENT DOCUMENTS

| | | | |
|---|---|---|---|
| 9,475,492 | B2 | 10/2016 | Okano et al. |
| 10,450,004 | B2 | 10/2019 | Kamiyama |
| 10,967,851 | B2 | 4/2021 | Krekel et al. |
| 2014/0073193 | A1 | 3/2014 | Soohoo et al. ............... 439/661 |
| 2014/0244095 | A1* | 8/2014 | Choi .................... B62D 15/029 701/25 |
| 2017/0096167 | A1 | 4/2017 | Yoon et al. ...................... 701/36 |
| 2018/0345955 | A1* | 12/2018 | Kim .................. B62D 15/0285 |
| 2019/0161118 | A1* | 5/2019 | Greenwood ........... G08G 1/142 |
| 2021/0046822 | A1 | 2/2021 | Kleen et al. |
| 2022/0358840 | A1 | 11/2022 | Wyszka et al. |

FOREIGN PATENT DOCUMENTS

| | | | | |
|---|---|---|---|---|
| DE | 102009040372 | A1 | 3/2011 | ............ B60W 30/06 |
| DE | 102011084586 | A1 | 4/2013 | .............. B60R 1/00 |
| DE | 102012222053 | A1 | 6/2013 | ............ B60R 16/02 |
| DE | 102012216753 | A1 | 3/2014 | ............ B60W 30/06 |
| DE | 102014110851 | A1 | 2/2016 | ............ B60W 10/04 |
| DE | 102016101359 | A1 | 7/2017 | ............ B60W 30/06 |
| DE | 102016122756 | A1 | 5/2018 | .............. G08G 1/14 |
| DE | 112016005614 | T5 | 9/2018 | ............ B60R 16/02 |
| DE | 102017111880 | A1 | 12/2018 | ............ B60W 10/04 |
| DE | 102018100289 | A1 | 7/2019 | ............ B60W 30/06 |
| DE | 102019204098 | A1 | 10/2020 | ............ B60W 30/06 |
| DE | 102019114399 | A1 | 12/2020 | ............ B60W 30/06 |
| DE | 102019208300 | A1 | 12/2020 | ............ B60W 30/06 |
| DE | 102019208788 | A1 | 12/2020 | .............. G08G 1/14 |
| DE | 102021206771 | A1 | 12/2022 | ............ B60W 50/14 |
| EP | 3421328 | A1 | 1/2019 | ............ B62D 15/02 |
| EP | 3653471 | A1 | 5/2020 | ............ B62D 15/02 |
| JP | 2004299651 | A | 10/2004 | .............. B60Q 1/02 |
| JP | 2011230762 | A | 11/2011 | ............ B60R 21/00 |
| KR | 20150051103 | A | 5/2015 | .............. B60R 1/08 |
| WO | 2014/073193 | A1 | 5/2014 | ............ B60R 21/00 |
| WO | 2023/274729 | A1 | 1/2023 | ............ B62D 15/02 |

OTHER PUBLICATIONS

International Search Report and Written Opinion, Application No. PCT/EP2022/066358, 11 pages, Sep. 16, 2022.

* cited by examiner

METHOD FOR OUTPUTTING A STARTING REGION FOR A PARKING PROCESS OF A MOTOR VEHICLE, ELECTRONIC COMPUTING APPARATUS, AND MOTOR VEHICLE

CROSS-REFERENCE TO RELATED APPLICATIONS

This application claims priority to German Patent Application No. DE 10 2021 206 771.9, filed on Jun. 29, 2021 with the German Patent and Trademark Office. The contents of the aforesaid patent application are incorporated herein for all purposes.

BACKGROUND

This background section is provided for the purpose of generally describing the context of the disclosure. Work of the presently named inventor (s), to the extent the work is described in this background section, as well as aspects of the description that may not otherwise qualify as prior art at the time of filing, are neither expressly nor impliedly admitted as prior art against the present disclosure.

The disclosure relates to a method for outputting a starting region for a parking process of a motor vehicle, to an electronic computing apparatus for a motor vehicle, and to a motor vehicle.

A parking assistance device is already known from DE 11 2016 005 614 T5 which has an imaging unit that records an image of a surroundings of an own motor vehicle and which device also has a display unit that displays a guiding image for guiding the own vehicle from a parking start position to a parking target position. Furthermore, the parking assistance device comprises a parking aid generation unit which generates an item of parking guidance information that shows a parking route based on basic information that includes an imaging result by the imaging unit, the parking start position, and the parking target position. Furthermore, the parking assistance device comprises a travel region ascertaining unit based the which, on parking information, ascertains a travel region within which the own vehicle can travel. Moreover, the parking assistance device comprises a display controller that generates, on the display unit, an image which shows the travel region together with the guiding image based on the parking guidance information.

SUMMARY

A need exists to make it possible to guide a driver to a particularly beneficial starting position for a parking process in a particularly simple manner.

The need is addressed by the subject matter of the independent claim(s). Other possible embodiments of the invention are disclosed in the dependent claims, the description, and the FIGS.

DESCRIPTION

Figure 1:
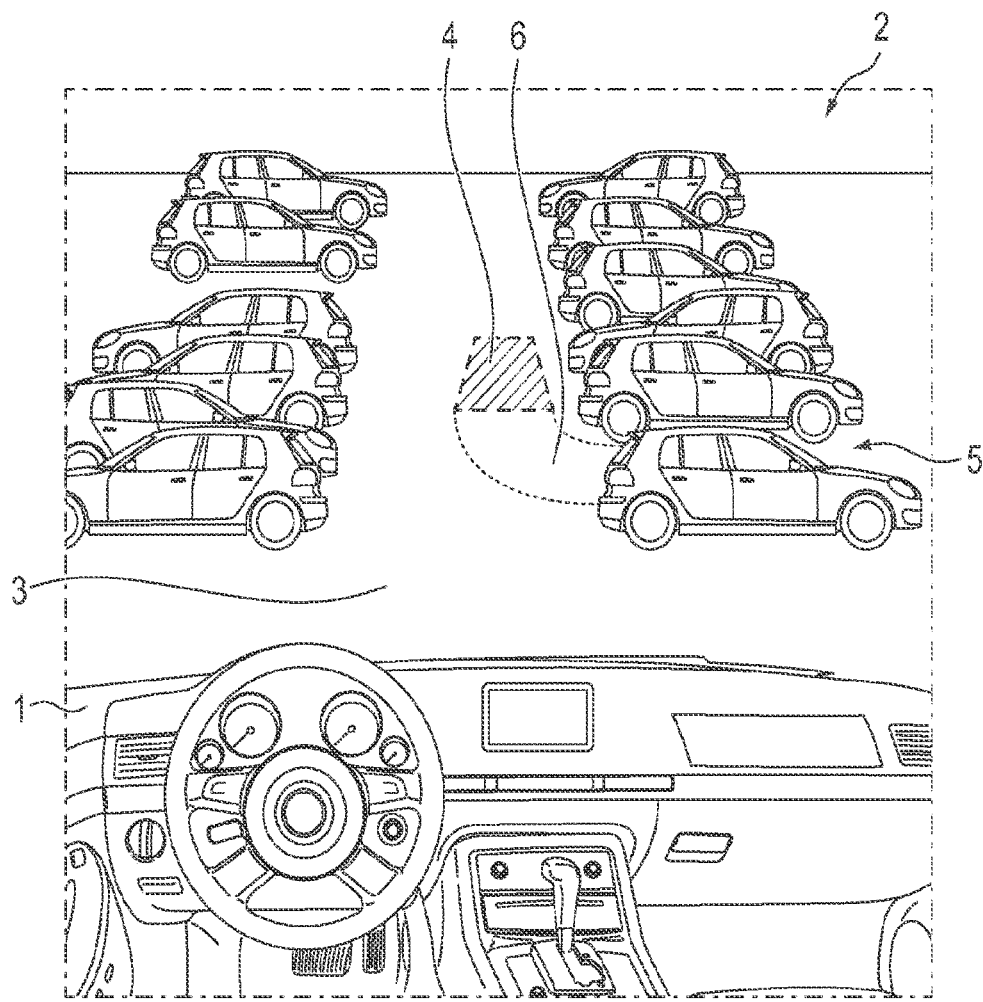
FIG. 1 is an example schematic view from a driver region of a motor vehicle into a surroundings of the motor vehicle, in which multiple parking spaces are available to the motor vehicle, wherein a starting region for starting a parking process of the motor vehicle is displayed overlying the road in a field of view of a driver of the motor vehicle.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

The disclosure relates to a method for outputting a starting region for a parking process of a motor vehicle. In the method, it is provided that the starting region for the motor vehicle on a road is determined for at least one determined parking space, starting from which region it is possible for the motor vehicle to be parked in the parking space in one go. In other words, the starting region for the motor vehicle is determined by means of an electronic computing apparatus depending on sensor data, wherein the motor vehicle can be parked in the parking space in one go when arranged in the starting region. Furthermore, it is provided in the method that the starting region is output overlying the road in a field of view of the driver. In other words, the starting region is displayed on the real road. The field of view is thus not displayed on a representation of the road on a display apparatus. Therefore, for a driver of the motor vehicle, this can make it appear as though the starting region is displayed in a demarcated manner on the road directly in the surroundings of the motor vehicle. As a result, the driver of the motor vehicle can estimate in a particularly simple manner the distance the motor vehicle must cover in order to be arranged within the starting region. In the method, it is particularly easy for the driver of the motor vehicle to see where the starting region is located in the surroundings of the motor vehicle. As a result, the driver of the motor vehicle can be assisted particularly well when heading for the starting region and when stopping the motor vehicle in the starting region.

In some embodiments, it is provided that the starting region is projected by means of augmented reality into a windscreen of the motor vehicle and output in the field of view of the driver. As a result, the starting region can be assimilated into the field of view of the driver by means of augmented reality. The driver can therefore identify the starting region for the motor vehicle particularly well while looking onto the road in front of the motor vehicle. This makes it possible to prevent output of the starting region from diverting the attention of the driver away from a road on which the motor vehicle is located.

In some embodiments, it is provided that the field of view is determined depending on a determined eye level and a determined viewing direction of the driver of the motor vehicle. In other words, the orientation of the eyes of the driver, the orientation of a perspective of the driver into the surroundings of the motor vehicle, and/or the orientation of a head and/or eye position of the driver in relation to the starting region is/are determined, wherein the starting region is output in the field of view depending on the determined eye level and the determined viewing direction of the driver of the motor vehicle. As a result, the driver can perceive the starting region particularly well.

In some embodiments, it is provided that the starting region is output in the field of view of the driver by means of laser beams projected onto the road. In other words, the motor vehicle may comprise a laser apparatus by means of which the road can be irradiated with laser beams within the determined starting region. The starting region can be marked on the road by means of the laser beams. Using the starting region marked by means of the laser beams, the driver of the motor vehicle can estimate a position of the motor vehicle relative to the starting region particularly well and, as a result, guide the motor vehicle into the starting region in a particularly simple and precise manner.

In some embodiments, it is provided that the starting region is output as a planar, demarcated region of the road. As a result, it is particularly easy for the driver to see how far the starting region extends on the road or, alternatively, how the motor vehicle should be arranged in order to be arranged completely within the starting region. As a result, the driver of the motor vehicle can be assisted particularly well when maneuvering the motor vehicle into the starting region.

In some embodiments, it is provided that, in addition to the starting region, an area to be driven over by the motor vehicle during the parking process when parking in the parking space proceeding from the starting region is output. Here, the area to be driven over can be represented by a trajectory to be covered by the motor vehicle from the starting region into the parking space. Using the displayed area to be driven over from the starting region into the parking space, the driver of the motor vehicle can estimate whether a collision with an object could occur when parking the motor vehicle in the parking space proceeding from the starting position. In particular, the starting region can be determined by means of an electronic computing apparatus of the motor vehicle in such a way that a collision of the motor vehicle with an object in the area to be driven over by the motor vehicle is prevented when the motor vehicle is being parked in one go. As a result, a risk of an accident during parking of the motor vehicle can be kept particularly low.

In some embodiments, it is provided that a symbol is output overlying the parking space in the field of view of the driver, wherein the symbol represents a determined likely orientation of the motor vehicle in the parking space for parking the motor vehicle in the parking space in one go proceeding from the starting region. Here, the symbol may represent and depict the motor vehicle in a likely state parked in the parking space. Therefore, an image of the motor vehicle in the parking space may be shown as the symbol, for example. Using the symbol, the driver of the motor vehicle can identify particularly well the orientation of the motor vehicle in the parking space after carrying out the parking process from the starting region into the parking space. In addition, based on the symbol, the driver of the motor vehicle can identify whether the motor vehicle should be parked in the parking space proceeding from the starting region in the parking space in a forwards parking process or in a reverse parking process for the parking in one go.

In this connection, it can in particular be provided that the symbol is output as a hologram overlying the parking space in the field of view of the driver. As a result, the driver of the motor vehicle can use the hologram, provided that the hologram constitutes an image of the motor vehicle, to estimate a three-dimensional extent of the motor vehicle particularly well for the state thereof parked in the parking space.

In this connection, it can further be provided that the symbol representing the orientation of the motor vehicle in a parking space is adapted depending on a received user input and the determined starting region is adapted depending on the adapted orientation represented by the adapted symbol. In other words, via the user input, the driver of the motor vehicle can adapt the intended orientation for the motor vehicle in the parking space, for example in that the driver changes the orientation of the symbol displayed in the parking space, in particular rotates same. As a result, the driver can specify, for example, that they wish to perform forward parking of the motor vehicle into the parking space instead of reverse parking of the motor vehicle into the parking space. The display of the motor vehicle in the parking space can therefore be adapted by the driver in order to adapt the planned orientation of the motor vehicle in the parking space. The determined starting region is adapted to the adapted orientation of the motor vehicle in the parking space in order to allow for parking of this kind of the motor vehicle into the parking space in one go, wherein the motor vehicle is arranged in the parking space in the orientation represented by the user input after completion of the parking process. By adapting the orientation of the symbol, the driver can thus set a final position of the motor vehicle in the parking space at the end of the parking process. As a result, the parking process can be adapted particularly well to desires of the driver of the motor vehicle.

In some embodiments, it is provided that the starting region is determined depending on at least one determined obstacle in the surroundings of the parking space and/or a width of the parking space and/or a length of the parking space and/or an orientation of the parking space. By determining the starting region depending on the at least one determined obstacle in the surroundings of the parking space, it can be ensured that a risk of collision of the motor vehicle with the obstacle is kept particularly low when parking the motor vehicle in the parking space in one go proceeding from the determined starting region. The determination of the starting region depending on the width of the parking space and/or the length of the parking space and/or the orientation of the parking space, for example as a parallel parking space or as a perpendicular parking space, makes it possible, when the motor vehicle is arranged in the starting region, to park the motor vehicle in the parking space such that there is a particularly high probability of this occurring in one go proceeding from its position in the starting region. This makes possible a particularly simple parking maneuver for parking the motor vehicle in the parking space proceeding from the starting region.

In some embodiments, it is provided that, when the motor vehicle is arranged in the starting region, the motor vehicle is moved into the parking space by means of assisted parking or by means of manual parking. In the case of assisted parking, the motor vehicle can be transversely guided at least by means of a control apparatus of the motor vehicle and, if applicable, additionally longitudinally controlled by the control apparatus of the motor vehicle during the parking process of the motor vehicle from the starting region into the parking space. Alternatively, the driver can manually park the motor vehicle in the parking space proceeding from the starting region, in particular in one go. On account of the assisted parking, the driver of the motor vehicle can be assisted particularly well with parking of the motor vehicle in the parking space. In the case of manual parking of the motor vehicle, the driver can be assisted particularly well with parking of the motor vehicle in one go by means of the display of the starting region.

In some embodiments, it is provided that respective starting regions are determined for different parking spaces and all determined starting regions are output as a summed overall region. A starting area can therefore be displayed as the overall region for the multiple parking spaces, wherein parking of the motor vehicle in one go is possible at least into one of the parking spaces when the motor vehicle is arranged in the starting area. As a result, the driver of the motor vehicle can be informed in a particularly simple manner as to where the motor vehicle is to be arranged on the road, in particular in the overall region, in order to allow for particularly simple parking of the motor vehicle in one of the parking spaces, in particular parking of the motor vehicle in one of the parking spaces in one go.

In some embodiments, it is provided that one parking space is selected from multiple parking spaces depending on a received user input and the starting region is determined and output for the selected parking space. In other words, multiple parking spaces in a surroundings of the motor vehicle can be determined by means of an electronic computing apparatus of the motor vehicle. Said multiple determined parking spaces can be output, in particular displayed, to the driver of the motor vehicle, as a result of which the driver of the motor vehicle can be informed particularly well of the multiple determined parking spaces. By means of the user input, the driver of the motor vehicle can select, from the multiple determined parking spaces, the parking space in which the motor vehicle is to be parked. The starting region can be determined for this selected parking space and, subsequently, output of the starting region can be triggered by means of the electronic computing apparatus. As a result, the driver of the motor vehicle can be assisted particularly well when parking the motor vehicle in one parking space of multiple parking spaces.

The disclosure also relates to an electronic computing apparatus for a motor vehicle that is configured to carry out a method of the like described above in connection with the method for outputting the starting region for the parking process of the motor vehicle. For this purpose, the electronic computing apparatus can be configured to determine a starting region for the motor vehicle on a road for at least one determined parking space, starting from which region it is possible for the motor vehicle to be parked in the parking space in one go. Furthermore, the electronic computing apparatus can be configured to trigger output of the starting region in a field of view of the driver and such that it overlies the road.

Furthermore, the disclosure relates to a motor vehicle having an electronic computing apparatus of the like described above in connection with the electronic computing apparatus. Benefits and embodiments of the method are to be understood as benefits and embodiments of the electronic computing apparatus and of the motor vehicle, and vice versa.

Other features of the invention can be found in the following description of the FIGS. with reference to the drawings.

In the embodiments described herein, the described components of the embodiments each represent individual features that are to be considered independent of one another, in the combination as shown or described, and in combinations other than shown or described. In addition, the described embodiments can also be supplemented by features other than those described.

Reference will now be made to the drawings in which the various elements of embodiments will be given numerical designations and in which further embodiments will be discussed.

Specific references to components, process steps, and other elements are not intended to be limiting. Identical or functionally identical elements are provided with the same reference numerals in the FIGS.

FIG. 1 shows a view from a cockpit of a motor vehicle 1 into a surroundings 2 of the motor vehicle 1. Here, the viewing direction proceeds, in particular, from a driver region onto a road 3 in front of the motor vehicle 1 in the direction of travel in the surroundings 2 of the motor vehicle 1. A starting region 4 is marked on the road 3 in the field of view of the driver of the motor vehicle 1, starting from which region a parking process of the motor vehicle 1 into a parking space 5 assigned to the starting region 4 is possible in one go. Said starting region 4 is projected into a field of view of the driver of the motor vehicle 1 via a windscreen of the motor vehicle 1 by means of augmented reality. Furthermore, an area 6 to be driven over by the motor vehicle 1 is indicated on the road 3 in the field of view of the driver, which area is driven over by the motor vehicle 1 during a parking process from the starting region 4 into the parking space 5.

Figure 2:
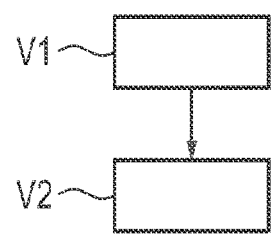
FIG. 2 is an example diagram for a method for outputting the starting region for the parking process of the motor vehicle.

FIG. 2 is a method diagram for a method for outputting a starting region for the parking process of the motor vehicle 1. Said method can be carried out by means of an electronic computing apparatus of the motor vehicle 1. In the method, it is provided that, in a first method step V1, the starting region 4 for the motor vehicle 1 on the road 3 is determined for the at least one determined parking space 5. Proceeding from this starting region 4, parking of the motor vehicle 1 in the parking space 5 is possible in one go. In a second method step V2 of the method, it is provided that said determined starting region 4 is output overlying the road 3 in a field of view of the driver of the motor vehicle 1. Here, the field of view can be marked directly on the road 3 via laser beams by means of a laser apparatus as an alternative to the display by means of augmented reality. In the present case, the starting region 4 is output as a planar, demarcated region on the road 3 in the field of view of the driver of the motor vehicle 1. As can be seen in FIG. 1, in addition to the starting region 4, the area 6 to be driven over by the motor vehicle 1 during the parking process from the starting region 4 into the parking space 5 can be output overlying the road 3 in the field of view of the driver.

The field of view of the driver of the motor vehicle 1 can be determined, in particular, depending on an eye level and a viewing direction of the driver of the motor vehicle 1. For this purpose, the driver region of the motor vehicle 1 can be monitored by means of a driver observation camera in order to determine the eye level and viewing direction of the driver of the motor vehicle 1 from image data recorded by means of the driver observation camera. In order to be able to prevent a collision of the motor vehicle 1 with an obstacle during the parking process, the starting region 4 can be determined depending on at least one determined obstacle in the surroundings 2 of the motor vehicle 1 or, alternatively, a surroundings of the parking space 5. Alternatively or additionally, the starting region 4 can be determined depending on a length and/or a width of the parking space 5 and/or an orientation of the parking space 5.

If multiple possible parking spaces 5 are determined for the motor vehicle 1, in particular by means of the electronic computing apparatus of the motor vehicle 1, the parking space 5 that is intended as the target parking space for the motor vehicle 1 can be selected depending on a user input that is received from the driver and that characterizes a selection of one of the multiple determined parking spaces 5. The starting region 4 for said selected target parking space can be determined output depending on the target parking space determined from the multiple parking spaces 5. Alternatively or additionally, the relevant starting region 4 can be determined for all parking spaces 5 determined in the surroundings 2 and each of the starting regions 4 can be output overlying the road 3 in the field of view of the driver. For this purpose, all determined starting regions 4 for the determined parking spaces 5 can be output as a summed overall region.

As soon as the motor vehicle 1 is arranged in the starting region 4, the motor vehicle 1 can be parked in the parking space 5 assigned to the starting region 4 in one go proceeding from the starting region 4 by means of assisted or manual parking.

In order to inform the driver of the motor vehicle 1 of the likely orientation of the motor vehicle 1 after the parking process in one go from the starting region 4 into the parking space 5, a symbol can be output overlying the parking space 5 in the field of view of the driver, wherein the symbol represents the likely orientation of the motor vehicle 1 in the parking space 5. Here, a hologram in the form of a motor vehicle 1 can be output as the symbol, in particular. A further user input of the driver of the motor vehicle 1 that characterizes a change of a desired orientation of the motor vehicle 1 in the parking space 5 can be received via an input apparatus of the motor vehicle 1 or of a mobile electronic terminal. As a result of the further user input being received, the symbol representing the orientation of the motor vehicle 1 in the parking space 5 can be adapted depending on the received further user input. It is also provided here that the starting region 4 assigned to the parking space 5 is adapted depending on the adapted likely orientation of the motor vehicle 1 in the parking space 5. Therefore, it is possible to output the starting region 4 which is intended for the orientation of the motor vehicle 1 in the parking space 5 desired by the driver and proceeding from which parking of the motor vehicle 1 in the parking space 5 is possible in one go with the final orientation of the motor vehicle 1 in the parking space 5 specified by means of the further user input of the driver.

The motor vehicle 1 may comprise an augmented reality output apparatus by means of which the starting region 4 can be projected by means of augmented reality into the windscreen of the motor vehicle 1 in the field of view of the driver.

The described method is based on the knowledge that performance of assisted parking systems is substantially dependent on a starting position from which the relevant parking space 5 is driven into. A distance between the motor vehicle 1 and the parking space 5 in the longitudinal direction and transverse direction as well as a lateral distance from stationary objects, for example other parked vehicles, can be crucial here. Under ideal conditions, a parking process proceeding from the starting position can be carried out by means of a parking assistant in one go without corrective movements and repositioning of the motor vehicle 1, as a result of which quick and accurate parking of the motor vehicle 1 in the intended parking space 5 is ensured.

In the method, an optimal starting region for the motor vehicle 1 is projected onto a ground plane in front of the possible parking space 5, in particular by means of augmented reality in the windscreen of the motor vehicle 1, or by means of laser projection onto the road lying ahead. Therefore, the starting region 4 proceeding from which the parking space 5 can be parked in in one go as well as the calculated area 6 to be driven over and over which the motor vehicle 1 drives on its way from the starting region 4 to the parking space 5 can be displayed in the field of view of the driver in order to visualize a planned trajectory and a planned target position for the motor vehicle 1. Furthermore, a three-dimensional hologram of the motor vehicle 1 can be displayed in the parking space 5, such that it can appear to the driver of the motor vehicle 1 as though their own motor vehicle 1 is already standing and parked in the parking space 5. As a result, the driver can identify the likely orientation of the motor vehicle 1 in the parking space 5 after the parking process particularly well.

In summary, the invention shows how augmented reality can be used to display the starting region 4 for the motor vehicle 1.

LIST OF REFERENCE NUMERALS

1 Motor vehicle
2 Surroundings
3 Road
4 Starting region
5 Parking space
6 Area to be driven over
V1 to V2 Respective method steps The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments. The term "in particular" and "particularly" used throughout the specification means "for example" or "for instance".

The mere fact that certain measures are recited in mutually different dependent claims or embodiments does not indicate that a combination of these measures cannot be used to advantage. Any reference signs in the claims should not be construed as limiting the scope.

What is claimed is:

1. A method for outputting a starting region for a parking process of a motor vehicle, comprising:
   determining the starting region for the motor vehicle on a road for at least one determined parking space, starting from which region it is possible for the motor vehicle to be parked in the parking space in one go; and
   displaying the starting region overlying the road in a field of view of the driver; wherein
   a symbol is output overlying the parking space in the field of view of the driver;
   the symbol represents a determined likely orientation of the motor vehicle in the parking space for parking the motor vehicle in the parking space in one go proceeding from the starting region;
   the symbol is output as a hologram overlying the parking space in the field of view of the driver; and wherein the symbol representing the orientation of the motor vehicle in the parking space is adapted depending on a received user input and the determined starting region is adapted depending on the adapted orientation represented by the adapted symbol.

2. The method of claim 1, wherein the starting region is projected using augmented reality onto a windscreen of the motor vehicle in the field of view of the driver.

3. The method of claim 1, comprising determining the field of view depending on a determined eye level and determining a viewing direction of the driver of the motor vehicle.

4. The method of claim 1, wherein the starting region is output in the field of view of the driver using laser beams projected onto the road.

5. The method of claim 1, wherein the starting region is output as a planar, demarcated region of the road.

6. The method of claim 1, wherein, in addition to the starting region, an area to be driven over by the motor vehicle during the parking process when parking in the parking space proceeding from the starting region is output.

7. The method of claim 1, wherein the starting region is determined depending on one or more of at least one determined obstacle in the surroundings of the parking space, a width of the parking space, a length of the parking space, and an orientation of the parking space.

8. The method of claim 1, wherein, when the motor vehicle is arranged in the starting region, the motor vehicle is moved into the parking space using assisted parking or using manual parking.

9. The method of claim 1, wherein respective starting regions are determined for different parking spaces and all determined starting regions are output as a summed overall region.

10. The method of claim 1, wherein one parking space is selected from multiple parking spaces depending on a received user input and the starting region is determined and output for the selected parking space.

11. An electronic computing apparatus for a motor vehicle, which is configured to:
    determine the starting region for the motor vehicle on a road for at least one determined parking space, starting from which region it is possible for the motor vehicle to be parked in the parking space in one go; and
    display the starting region overlying the road in a field of view of the driver, wherein
    a symbol is output overlying the parking space in the field of view of the driver;
    the symbol represents a determined likely orientation of the motor vehicle in the parking space for parking the motor vehicle in the parking space in one go proceeding from the starting region;
    the symbol is output as a hologram overlying the parking space in the field of view of the driver, and wherein
    the symbol representing the orientation of the motor vehicle in the parking space is adapted depending on a received user input and the determined starting region is adapted depending on the adapted orientation represented by the adapted symbol.

12. A motor vehicle having an electronic computing apparatus of claim 11.

13. The method of claim 2, comprising determining the field of view depending on a determined eye level and determining a viewing direction of the driver of the motor vehicle.

14. The method of claim 2, wherein the starting region is output in the field of view of the driver using laser beams projected onto the road.

15. The method of claim 3, wherein the starting region is output in the field of view of the driver using laser beams projected onto the road.

16. The method of claim 2, wherein the starting region is output as a planar, demarcated region of the road.

17. The method of claim 3, wherein the starting region is output as a planar, demarcated region of the road.

* * * * *